(12) United States Patent
van de Burgt et al.

(10) Patent No.: US 11,665,021 B2
(45) Date of Patent: May 30, 2023

(54) CAN TRANSCEIVER

(71) Applicant: NXP B.V., Eindhoven (NL)

(72) Inventors: Rolf van de Burgt, Oosterbeek (NL); Franciscus Johannes Klösters, Schaijk (NL)

(73) Assignee: NXP B.V., Eindhoven (NL)

( * ) Notice: Subject to any disclaimer, the term of this patent is extended or adjusted under 35 U.S.C. 154(b) by 125 days.

(21) Appl. No.: 17/009,767

(22) Filed: Sep. 1, 2020

(65) Prior Publication Data

US 2022/0070022 A1 Mar. 3, 2022

(51) Int. Cl.
| | |
|---|---|
| *H04L 12/413* | (2006.01) |
| *H04B 1/40* | (2015.01) |
| *H04L 7/033* | (2006.01) |
| *H04L 12/40* | (2006.01) |
| *G06F 1/14* | (2006.01) |
| *G06F 21/85* | (2013.01) |

(52) U.S. Cl.
CPC ........... *H04L 12/4135* (2013.01); *H04B 1/40* (2013.01); *H04L 7/033* (2013.01); *H04L 12/40163* (2013.01); *G06F 1/14* (2013.01); *G06F 21/85* (2013.01); *H04L 2012/40215* (2013.01); *H04L 2012/40273* (2013.01)

(58) Field of Classification Search
CPC .................................................. H04L 12/4135
See application file for complete search history.

(56) References Cited

U.S. PATENT DOCUMENTS

| | | | |
|---|---|---|---|
| 8,566,632 B2 | 10/2013 | Burgt et al. | |
| 10,567,192 B2 | 2/2020 | van de Burgt et al. | |
| 2008/0180145 A1* | 7/2008 | Lundberg | H03L 7/0814 327/158 |
| 2010/0244919 A1 | 9/2010 | Horton et al. | |
| 2013/0108278 A1* | 5/2013 | Azadeh | H04B 10/695 398/202 |
| 2014/0208422 A1* | 7/2014 | Porat | G06F 21/606 726/22 |
| 2017/0093659 A1* | 3/2017 | Elend | H04L 63/1416 |
| 2021/0400056 A1* | 12/2021 | Klösters | H04L 63/126 |

FOREIGN PATENT DOCUMENTS

EP 3691198 A1 * 8/2020 ............... H03F 3/26

* cited by examiner

*Primary Examiner* — Abdeltif Ajid

(57) ABSTRACT

A transceiver for sending and receiving data from a controller area network (CAN) bus is disclosed. The transceiver includes a microcontroller port, a transmitter and a receiver, wherein the transceiver is configured to determine bit timings from a data frame received by the receiver. The transceiver is further configured to detect attempts to introduce a signal glitch in a predetermined portion of the data frame and upon detection of the signal glitch, the transceiver is configured to invalidate the data frame on a transmission line and/or disable the transmitter for a predetermined period.

15 Claims, 4 Drawing Sheets

CAN TRANSCEIVER

BACKGROUND

A Controller Area Network (CAN bus) is a vehicle bus standard designed to allow microcontrollers and devices to communicate with each other's applications without a host computer. CAN is a message-based protocol that uses two wires to enable multiple devices to communicate with each other and is used in many type of applications including automotive applications. For each message, the data in a packet is transmitted sequentially but in such a way that if more than one device transmits messages at the same time, only the highest priority message is able to continue while other devices stop transmitting their message. This process, known as "arbitration", is used by all sending devices and the device that attempts to send the highest priority message wins the arbitration. Transmitted packets are received by all devices, including by the transmitting device receiving its own message. However, a malicious device may attempt to hijack the bus control even after losing the arbitration.

CAN is a two-wire differential, half-duplex, high-speed serial network typically used to provide communications between network nodes without loading down microcontrollers. CAN transceivers interface between the CAN protocol controller and the physical wires of the CAN bus lines. A transceiver is used by a microcontroller to send and receive data on a CAN bus. A typical transceiver normally provides a ISO 11898 standard compliant communication over the CAN bus without scrutinizing the data content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a transceiver for sending and receiving data from a controller area network (CAN) bus is disclosed. The transceiver includes a microcontroller port, a transmitter and a receiver, wherein the transceiver is configured to determine bit timings from a data frame received by the receiver. The transceiver is further configured to detect attempts to introduce a signal glitch in a predetermined portion of the data frame and upon detection of the glitch, the transceiver is configured to invalidate the data frame on a transmission line and/or disable the transmitter for a predetermined period.

In some examples, the invalidation includes sending a CAN error message on to the CAN bus. The transceiver is configured to check during a transmission of the data frame if the microcontroller coupled to the microcontroller port had lost or won arbitration. The transceiver is may also be configured to generate and send an invalidation signal on to the CAN bus to invalidate the data frame if the microcontroller introduces the signal glitch in the data frame. In some examples, the transceiver is configured to send a dominant bit on to the CAN bus to invalidate the data frame if the microcontroller introduces the signal glitch. The transmitter may include an enable port to enable or disable the transmitter and the transceiver is configured to generate an enable/disable signal based on a detection of the signal glitch.

The transceiver includes a clock recovery and sampling circuit coupled with the transmitter. The clock recovery and sampling circuit is configured to check bit length in a data sent by the microcontroller. The clock recovery and sampling circuit is further configured to detect improper bit timing in the data sent by the microcontroller based on a prestored configuration data. The transceiver may include a memory to store the configuration data.

In some examples, the predetermined portion is identified based on a bit length of the data frame and the detection of the signal glitch includes monitoring a change in the signal amplitude beyond a predetermined threshold during the predetermined portion.

In another embodiment, a method for preventing a node from interrupting a communication on a controller area network (CAN) bus is disclosed. The method determining a bit timing from a data frame received from the CAN bus, detecting a signal glitch during a predetermined portion of the data frame and upon detection of the signal glitch, invalidating the data frame and disable a transmitter for a predetermined period. The detecting of the signal glitch includes monitoring a change in the signal amplitude beyond a predetermined threshold during the predetermined portion. The predetermined portion is configured based on bit length of the data frame and a bit timing configuration data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Figure 1:
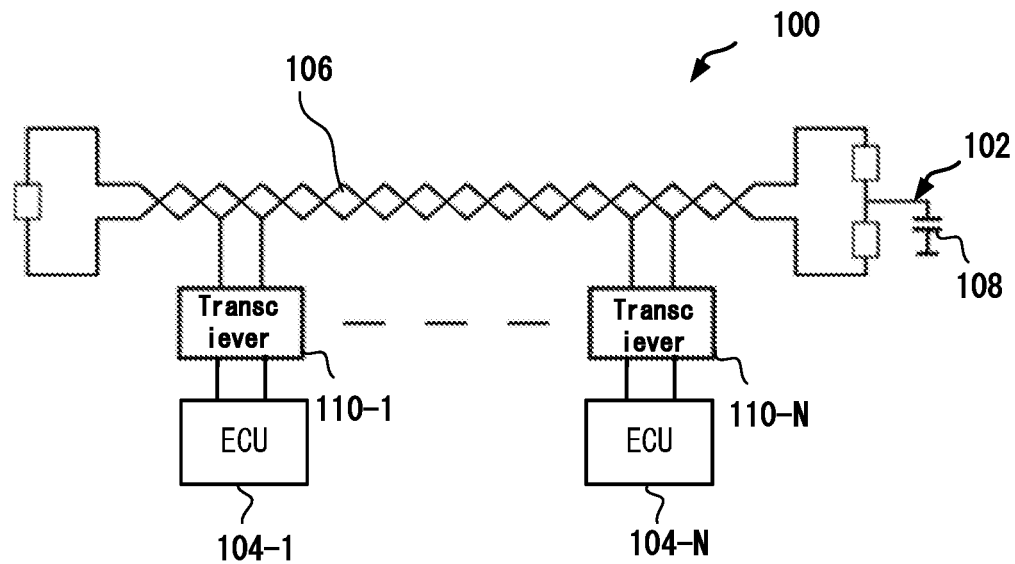
FIG. 1 depicts a controller area network (CAN) bus with communication nodes.

Note that figures are not drawn to scale. Not all components of the secure transceiver are shown. The omitted components are known to a person skilled in the art.

DETAILED DESCRIPTION

Many well-known manufacturing steps, components, and connectors have been omitted or not described in details in the description so as not to obfuscate the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", "one example", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Controller Area Network (CAN) is a peer-to-peer network. Meaning that there is no master that controls when individual nodes have access to read and write data on the CAN bus. When a CAN node is ready to transmit data, it checks to see if the CAN bus is free and then simply writes a CAN frame onto the network. The CAN frames that are transmitted do not contain addresses of either the transmitting node or any of the intended receiving node(s). Instead, an arbitration ID that is unique throughout the network is contained in a data frame. All nodes on the CAN network receive every CAN frame that is transmitted by any node, and, depending on the message or arbitration identifier of the transmitted frame, each CAN node on the network decides whether to accept the frame for further processing.

If multiple nodes try to transmit messages onto the CAN bus at the same time, the node with the highest priority (lowest value of message or arbitration identifier) gets bus access. Lower-priority nodes (or messages) must wait until the bus becomes available before trying to transmit again.

CAN nodes (e.g., ECUs) use transceivers to interface with the CAN bus. The transceivers include an Rx port and a Tx port to enable communication with other CAN nodes through the CAN bus 100. Transceivers normally provide a simple interface for mode control from a device/microcontroller in a network. A typical standard transceiver makes use of up to two dedicated mode control pins, and this means that there are usually not more than four different states of operation.

The CAN protocol specifies the structure of a CAN frame. The CAN frame includes:

1. SOF (start-of-frame) bit—indicates the beginning of a message with a dominant (logic 0) bit.
2. Message or Arbitration ID—identifies the message and indicates the message's priority. Frames come in two formats—standard, which uses an 11-bit arbitration ID, and extended, which uses a 29-bit arbitration ID.
3. IDE (identifier extension) bit—allows differentiation between standard and extended frames.
4. RTR (remote transmission request) bit—serves to differentiate a remote frame from a data frame. A dominant (logic 0) RTR bit indicates a data frame. A recessive (logic 1) RTR bit indicates a remote frame.
5. DLC (data length code)—indicates the number of bytes the data field contains.
6. Data Field—contains 0 to 8 bytes of data.
7. CRC (cyclic redundancy check)—contains 15-bit cyclic redundancy check code and a recessive delimiter bit. The CRC field is used for error detection.
8. ACK (ACKnowledgement) slot—any CAN controller that correctly receives the message sends an ACK bit at the end of the message. The transmitting node checks for the presence of the ACK bit on the bus and reattempts transmission if no acknowledge is detected.
9. CAN Signal—an individual piece of data contained within the CAN frame data field. You also can refer to CAN signals as channels. Because the data field can contain up to 8 bytes of data in Classical CAN and up to 64 bytes in CAN FD.

FIG. 1 depicts a controller area network (CAN) bus 100. The CAN bus 100 includes terminating end resistors to suppress wave reflections. In some embodiments, a capacitor 108 may also be used at a terminating end. The CAN bus 100 includes a twisted wire pair 106. The twisted wire pair 106 includes CANH and CANL wires. The CAN bus 100 may include a plurality of communication microcontrollers or electronic control units (ECUs) 104-1 . . . 104-N coupled with the twisted wire pair through a plurality of secure transceivers 110-1 . . . 110-N. The capacitor 108 is typically 4.7 nF. The value of the capacitor 108 may be increased to approximately 100 nF. By increasing the value of the capacitor 108, a signal voltage at CANL or CANH during intermittent opens is improved. In one example, the resistors coupled with the capacitor 108 are typically 60 ohm each (total 120 ohm at each end).

As shown, the communication nodes (ECUs) 104-1 . . . 104-N are connected via an unshielded twisted pair 106. Termination is implemented at the far left- and right-hand side of the CAN bus 100. There are two options, either by using a single resistor as shown in the left-hand side of the CAN bus 100, or via two resistors and the capacitor 108, referred to as "split-termination" as shown on the right-hand side of the CAN bus 100. The latter method is commonly used as it offers an additional low-pass filtering to improve EMC performance.

Figure 2:
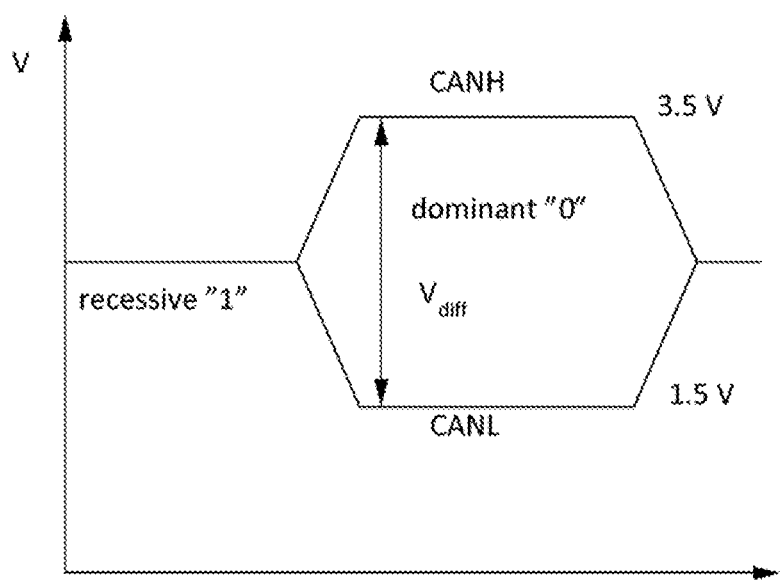
FIG. 2 depicts CAN bus communication protocol showing a representation of "0" and "1" based on a differential voltage at CANH and CANL.

As shown in FIG. 2, in normal operations (when no errors are present), the CAN bus 100 signals CANH and CANL are driven such that a differential voltage is generated (to send a dominant signal) or no differential signal is generated (to send a recessive bit). In some implementations, for a dominant bit ("0") the voltage at CANL is approximately 1.5V and the voltage at CANH is 3.5V and $V_{diff}$ represents a difference between the voltages at CANH and CANL. In some examples, Vdiff>0.9V may be considered a dominant bit and Vdiff<0.5 may be considered a recessive bit.

The communication nodes (e.g., ECUs 104-1 . . . 104-N) on the CAN bus 100 that wish to send data on the CAN bus send a dominant SOF bit when the CAN bus 100 is idle (e.g., in the recessive state for a duration) to indicate that the nodes would like to send a data frame. Next, each node sends a message identifier. Note that the nodes are configured such that no two nodes can send a data frame including the same message identifier. The CAN protocol provides an 11-bit message identifier. In another version of the CAN protocol, the message identifier is specified to include 29 bits. The relative priority of a message identifier is characterized by the value of the message identifier. A lower value message identifier has a higher priority. For example, the message identifier with the value 11001000111 (0x647) will have a higher priority than the message identifier with the value 11011111111 (0x6FF).

If the ECU 104-1 and the ECU 104-N simultaneously send SOF bit and then start transmitting the message identifiers 11001000111 and 11011111111 respectively, on the fourth bit, the ECU 104-1 will win the arbitration because it will send a dominant bit, which will overwrite the recessive bit sent by the ECU 104-N. The ECU 104-1 will read a dominant bit after sending a dominant bit on the CAN bus 100 and will continue to send further data bits whereas the ECU 104-N will read a dominant bit after having sent a recessive bit (e.g., the fourth most significant bit in the above message identifier example) and will assume that it has lost the arbitration and will stop sending further data bits on the CAN bus 100, and will wait for the CAN bus 100 to be free again before attempting to send the message, at which time, the process of arbitration will start again.

Figure 3:
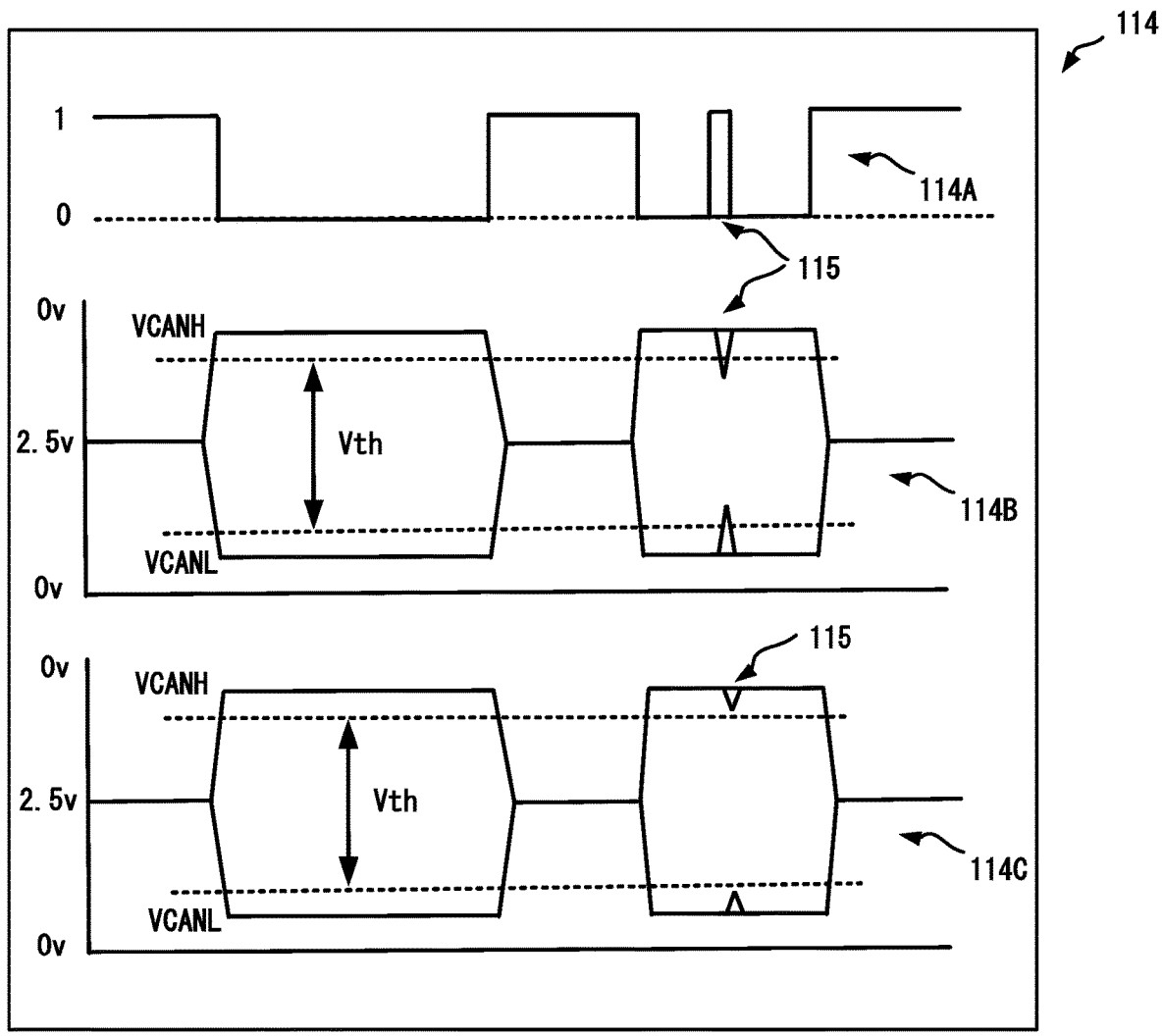
FIG. 3 depicts sample logical and physical CAN signals showing a glitch in accordance with one more embodiments of the present disclosure.

FIG. 3 shows sample logical and voltage CAN signals 114. The signal 114A shows a logical signal that corresponds to the voltage signal 114B. A spurious ECU (e.g., 104-N) may insert a glitch 115 in the signal to disrupt the transmission. As shown, the glitch 115 may cause data error because during a recessive bit transmission, a dominant section will be introduced causing a data error. The signal 114B shows VCANH and VCANL voltage levels. The voltage levels are shown for example only. In some examples, the these voltage levels may be different as allowed by the CAN protocol. Vth is a threshold voltage (e.g., Vdiff in FIG. 2). The differential voltage levels below Vth may translate into a recessive bit and the differential voltage levels above Vth may translate into a dominant bit. In some examples, as shown in the signal 114C, the voltage level of the glitch 115 may attenuate due to low/high pass filters created by the parasitic components of the wire pair 106 when the signal transmits over the wire to a distant node. It should be noted that in some examples, the glitch 115 may also be caused by noise.

Figure 4:
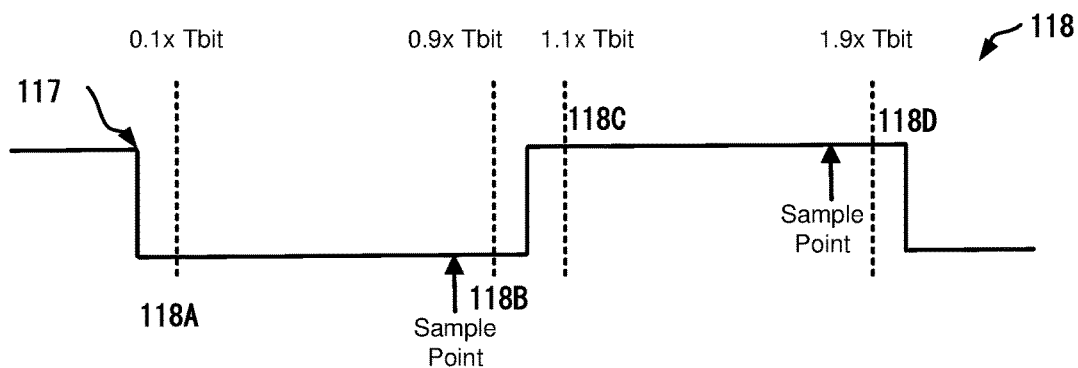
FIG. 4 shows a sample CAN signal with configurable timing portions.

FIG. 4 shows a sample CAN signal with configurable timing portions. To invalidate the effect of a glitch introduced by an spurious ECU, the embodiments described here use bit timing recovery process with configurable thresholds 118A, 118B, 118C, 118D and the transceiver ensures that the ECU coupled to the transceiver cannot insert a glitch between the thresholds 118A and 118B and also between thresholds 118C and 118D.

If the communication node including the ECU 104-N is transmitting a frame, the receiving node including the ECU 104-1 consisting of the transceiver 120 with protocol engines (not shown), perform independently clock recovery and sampling. If the ECU 104-N includes a defect or compromised software, it can occur that the bit patterns transmitted by the transmitting node can contain intended or unintended glitches or deviating bit timing. Due to difference in signal attenuation or signal propagation times in the network, it can occur that the receiving nodes decode the received data differently. In some examples, the transceiver 120 described in the next figure starts monitoring a dominant bit on the falling edge 117. With the bit length already known, the transceiver 120 marks a part of the bit (shown between the markets 118A and 118B). The portion length can be configurable. In some examples, it may cover approximately 80-90% of the bit length.

Figure 5:
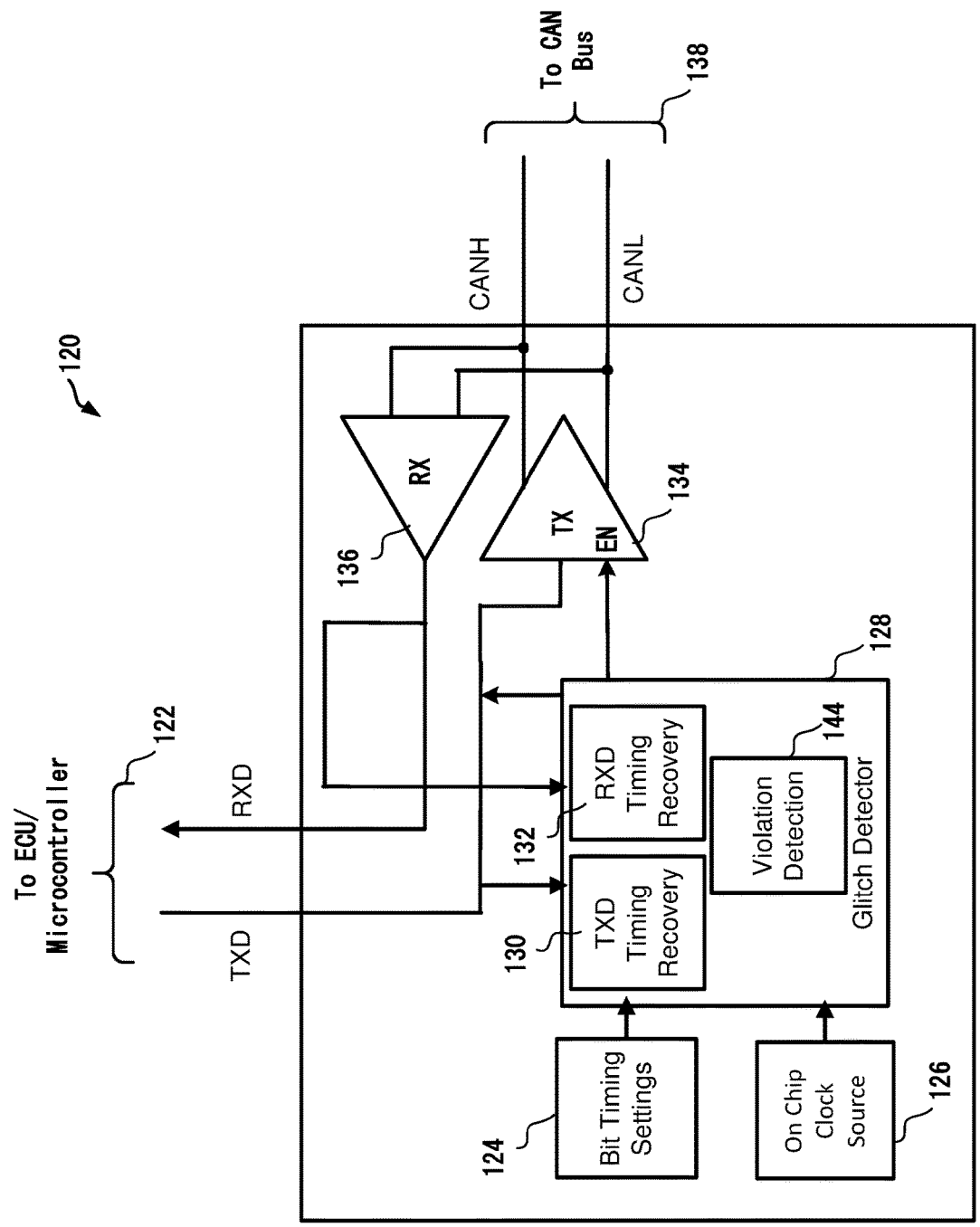
FIG. 5 shows a schematic of a secure transceiver in accordance with one or more embodiments of the present disclosure.

FIG. 5 shows a transceiver 120. Note that many known components of the transceiver 120 have been omitted so as not to obfuscate the present disclosure. The transceiver 120 may replace the transceiver 110-N in FIG. 1 (and of course any other transceiver on the CAN bus 100) to make the CAN bus 100 shown in FIG. 1 a secure CAN bus. With the transceiver 120 monitoring the ECU 104-N, the ECU 104-N will no longer, after the first attempt, be able to maliciously interrupt the data communication on the CAN bus 100.

The transceiver 120 includes a transmitter (TX) 134 and a receiver (RX) 136. The transceiver 120 includes a microcontroller port 122 to send/receive data from a microcontroller or ECU. The transceiver 120 also includes a CAN bus port 138 to send/receive data to/from a CAN bus 100. The data received from the CAN bus 100 is transmitted to the microcontroller to enable the microprocessor to functionally process the received data. Similarly, when a data is received from the microcontroller or ECU, the received data is transmitted to the CAN bus 100. The TX 134 translates the data received from the microcontroller in a signal that is compliant with CAN standards.

The transceiver 120 also includes a glitch detector 128. The glitch detector 128 may be coupled to a on chip clock source 126 that provides a synchronization clock. A bit timing settings module 124 may be included to provide bit width and sampling times. The bit timing settings module 124 may also keep track of a current bit position in a data frame when the data frame is being processed by the glitch detector 128. The glitch detector 128 includes a TXD timing recovery module 130 and a RXD timing recovery module 132. The TXD timing recovery module 130 monitors T×D line coupled to the microcontroller port 122 and the RXD timing recovery module 132 monitors R×D line coupled to the microcontroller port 122. In some examples, the transceiver 120 includes only TXD timing recovery module 130 and not the RXD timing recovery module 132. The transceiver 120 may be configured to prevent the microcontroller coupled to the ECU port 122 from introducing glitches as discussed above.

A violation detector 144 is included to identify glitches in the data being received or being transmitted through the microcontroller port 122. In some examples, the glitch detector 128 may also include a processor (not shown). In other examples, the glitch detector 128 may be implemented in hardware only. Referring back to FIG. 4 again, the bit width and sample time are known and preset according to the protocol being used. In some examples, the CAN frame may include information such that the baud rate from which a bit which can be determined. The violation detector 144 monitors the data being sent by the microcontroller coupled to the ECU port 122 and if the violation detector 144 detects a pulse transition between the markers 118A and 118B, the glitch detector 128 may use the EN pin of the TX 134 to prevent the microcontroller from transmitting the data for a predetermined period or time. In some embodiments, the glitch detector 128 may send a CAN error frame or invalidation signal on the CAN bus 100 to indicate that the earlier frame was invalid and should be disregarded by the communication nodes.

The issue with glitches, noise or misbehaving host in terms of bit timing, is that there is a possibility that in a large network with several receiving nodes, some nodes might sample different data. As the glitch 115 propagates through the network, the distant nodes will see a different data because the filtering effect will attenuate (such that the differential voltage at the glitch 115 is below the threshold Vth) the glitch 115 before it reaches a distant node. If a TX 134 has a short glitch on the digital input, it will result in spikes on both sides of the differential output as shown in FIG. 3. The TX 134 has a moderate low pass filter behavior. On a receiver that is close by, the differential glitching signal is decoded as the same signal that the transmitter had on the input. The signal on the far receiving node will not see the glitch trespassing the threshold to go back to recessive and the receiver will sample a dominant bit. The fact that different nodes get different information contents in the CAN bus 100 is not wanted in terms of safety and security.

In some examples, the transceiver 120 is equipped with a CAN ISO11898 compliant receiver (e.g., the RX 136) that is capable of decoding frames on the CAN bus 100. The transceiver 120 also contains a clock recovery and sampling circuit 130 on the TX input from the microcontroller configured to be coupled with the ECU port 122. The bits received on the ECU port 122 are checked for length, glitches and/or improper bit timing. If a deviation from expected behavior is detected, the glitch detector 128 will invalidate the frame on the CAN bus 100 to cause the transmitting node to retransmit the frame and/or disable transmit and/or receiving capabilities of the transceiver 120 to isolated unexpected behavior of the microcontroller that is coupled with the ECU port 122.

The glitch detector 128 is configured to perform clock recovery on RXD and/or TXD and includes a state machine to follow the CAN protocol to be aware of the CAN protocol and match the required bit timings. In some examples, the bit timings may be different for different frames. In such examples, the data frame will include the bit rate switch bit to enable the transceiver 120 to determine a bit length of the data bit included in the frame. The transceiver 120 in this example has an on-chip oscillator and memory (may be included in the bit timing settings module 124) to store the bit timing settings for the CAN network. In case of a violation of the CAN protocol or glitch detection configuration, the glitch detector 128 may transmit dominant bits on the CAN bus 100 to invalidate the frame and/or overrule the RXD towards the microcontroller coupled with the ECU port 122 and/or isolate the TXD path towards the CAN bus 100.

The configuration data, containing bit timing settings, may be pre-stored in the transceiver 120. The configuration data may be stored in non-volatile memory or downloaded in volatile memory before the transceiver 120 is bring to an operational mode. The transceiver 120 is configured to modify the RXD data on the fly towards the microcontroller coupled with the ECU port 122 and overrule the data on the CAN bus 100 by transmitting a dominant bit or an invalidation signal and/or disable the TX 134.

In some examples, the glitch detector 128 monitors if the microcontroller connected to the microcontroller port 122 has won or lost arbitration. If the CAN frame is tampered by a malicious microcontroller (or host or ECU), a remote node on the CAN bus 100 will stop sending further data frame due to a bit error. Normally an error frame can be send on the first 16 bit occurrences by the remote node. For the next 16 bit occurrences the remote node will be error passive and will not send error frames and stops transmitting. This event may provide a malicious microcontroller coupled with the microcontroller port 122 sixteen chances to send the remainder of the data frame containing malicious data. If the microcontroller coupled with the ECU port 122 has lost arbitration, there should be no traffic on TXD except a possible error frame or an ACK to confirm the CAN frame is received. The violation detector 144 may disable the TX 134 so that a malicious microcontroller cannot send a data.

In some examples, the transceiver 120 may not include any additional pins so that the transceiver 120 may be used as a "drop in" to replace a conventional CAN transceiver. In the examples in which the glitch detector 128 is implemented either fully or partially in software, the transceiver 120 may be configured to be programmed with additional data validation rules. In some examples, if the transceiver 120 is configurable to be programmed, a tamper proof security mechanism may be employed such that only authorized devices or entities may alter the existing programming stored in the transceiver 120. In some examples, the microcontroller coupled with the ECU port 122 may have won the arbitration, hence is allowed to start sending the data frames to the CAN bus 100 via the TX 134. The microcontroller may then attempt to introduce a glitch in a data frame. Any data frame sent to the CAN bus 100 is received by all nodes including the local node that sent the data frame. Hence, the same processes of invalidating the glitch will be applicable even if the local microcontroller has sent that data frame as the same data frame will be also be received by the RX 136 to enable the transceiver to determining bit timings and start monitoring the transmission for any glitches.

Figure 6:
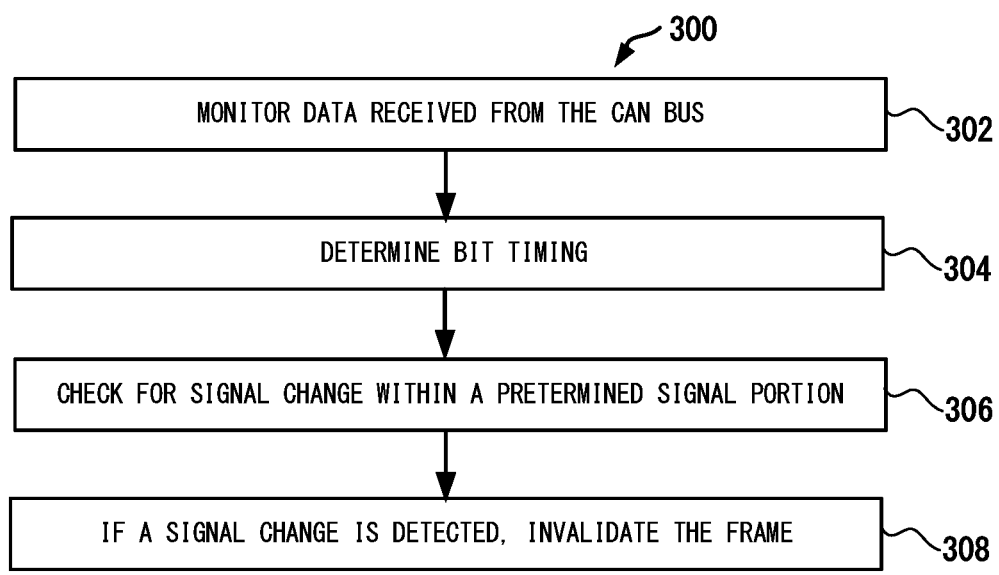
FIG. 6 illustrates a flow diagram to secure CAN data transmission in accordance with one or more embodiments of the present disclosure.

FIG. 6 shows a flow diagram 300 for prohibiting a malicious microcontroller (or ECU or local host) from disrupting or corrupting the data transmission on the CAN bus 100 by introducing a glitch in the data frame. Accordingly, at step 302, the glitch detector 128 monitors data received by a receiver in the transceiver 120. At step 304, the glitch detector 128 determines bit timings from the received data. At step 306, the glitch detector 128 checks for a signal change attempts by a microcontroller coupled with the transceiver 120 within a predetermined portion of a bit. At step 308, if a signal change, e.g., a glitch as discussed above, is detected, the transceiver 120 is configured to invalidate the data frame to cause the sender to retransmit. The transceiver 120 may also be configured to disable the microcontroller from sending further data bits at least for a predetermined time.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A transceiver configured to send and receive data from a controller area network (CAN) bus, the transceiver comprising:
    a microcontroller port configured to be coupled to a microcontroller, a transmitter, a receiver, and a clock recovery and sampling circuit coupled to the transmitter;
    wherein the clock recovery and sampling circuit is configured to detect, based on prestored configuration data, instances of improper bit timing in data received via the microcontroller port from the microcontroller coupled to the microcontroller port;
    wherein the transceiver is configured to:
        determine, using the clock recovery and sampling circuit, bit timings from a data frame received by the receiver via the microcontroller port;
        determine, during a transmission of the data frame, that the microcontroller coupled to the microcontroller port has lost arbitration;
        detect a signal glitch in a predetermined portion of the data frame using the clock recovery and sampling circuit to detect an improper bit timing in the predetermined portion of the data frame;
    wherein, in response to determining that the microcontroller lost arbitration, and in response to detecting the signal glitch, the transceiver is further configured to invalidate the data frame on a transmission line and/or disable the transmitter for a predetermined period.

2. The transceiver of claim 1, wherein, when the transceiver is configured to invalidate the data frame, the transceiver is configured to send a CAN error message on to the CAN bus.

3. The transceiver of claim 1, further configured to:
    determine that the microcontroller has introduced the signal glitch in the data frame; and
    in response to determining that the microcontroller has introduced the signal glitch in the data frame, generate and send a CAN error frame on to the CAN bus to invalidate the data frame.

4. The transceiver of claim 1, further configured to send a dominant bit on to the CAN bus to invalidate the data frame if the microcontroller introduces the signal glitch.

5. The transceiver of claim 1, wherein the transmitter includes an enable port to enable or disable the transmitter.

6. The transceiver of claim 5, further configured to generate an enable/disable signal based on a detection of the signal glitch.

7. The transceiver of claim 1, wherein the clock recovery and sampling circuit is further configured to check a bit length of the data received from the microcontroller via the microcontroller port.

8. The transceiver of claim 1, further comprising a memory configured to store the configuration data.

9. The transceiver of claim 1, wherein the predetermined portion is identified based on a bit length of the data frame.

10. The transceiver of claim 1, wherein the detection of the signal glitch includes monitoring a change in the signal amplitude beyond a predetermined threshold during the predetermined portion.

11. The transceiver of claim 1, wherein, in response to determining that the microcontroller lost arbitration, and in response to detecting the attempt to introduce the signal glitch, the transceiver is further configured to invalidate the data frame on the transmission line.

12. The transceiver of claim 1, wherein, in response to determining that the microcontroller lost arbitration, and in response to detecting the attempt to introduce the signal glitch, the transceiver is further configured to disable the transmitter for the predetermined period.

13. A method for preventing a node from interrupting a communication on a controller area network (CAN) bus, the method comprising:
    determining a bit timing within a data frame received from a device coupled to the CAN bus;
    detecting a signal glitch during a predetermined portion of the data frame by detecting, using clock recovery and sampling circuitry, that the bit timing is an improper bit timing based on a prestored configuration data;
    determining, during transmission of the data frame, that the device coupled to the CAN bus has lost arbitration; and
    in response to detection of the signal glitch and in response to determining that the device lost arbitration during transmission of the data frame, invalidating the data frame and disabling a transmitter for a predetermined period.

14. The method of claim 13, further comprising detecting another signal glitch by detecting a change in the signal amplitude beyond a predetermined threshold during the predetermined portion.

15. The method of claim 13, wherein the predetermined portion is configured based on a bit length of the data frame and bit timing configuration data.

\* \* \* \* \*